Jan. 7, 1969 G. L. SMITH 3,420,376
FILTER APPARATUS FOR SWIMMING POOL WATER
Filed Feb. 7, 1966
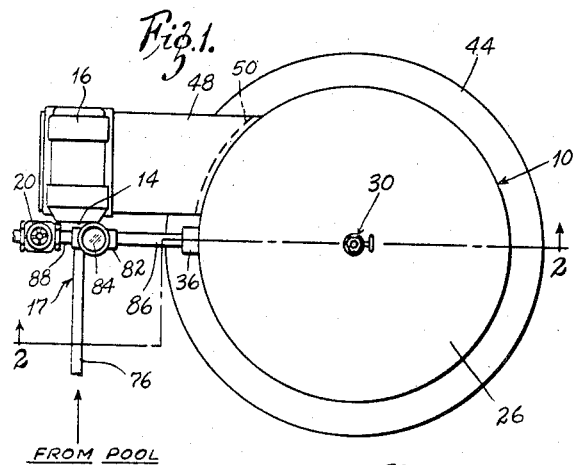
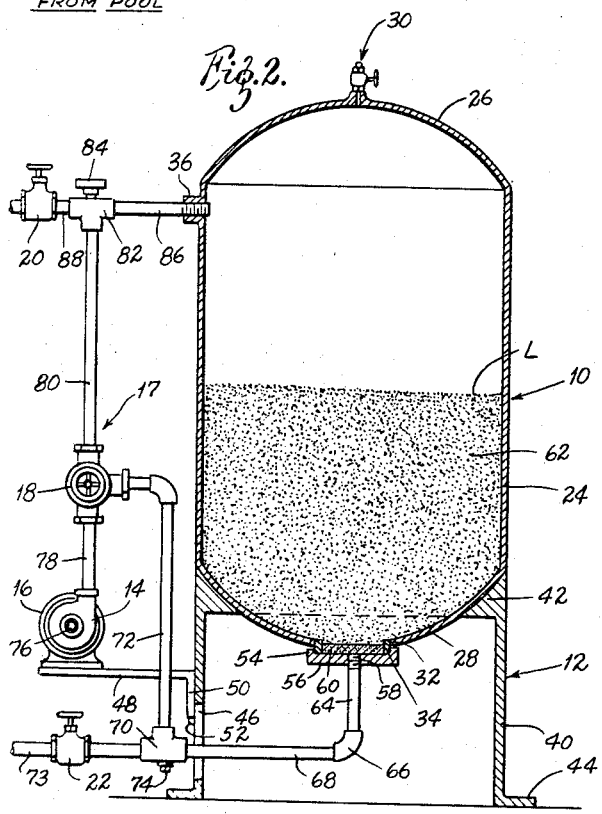
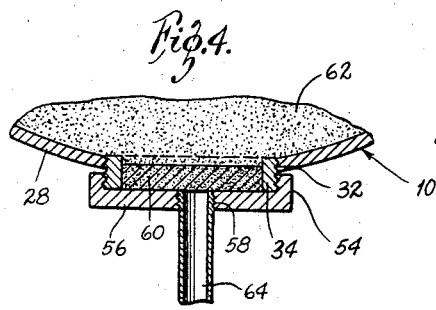
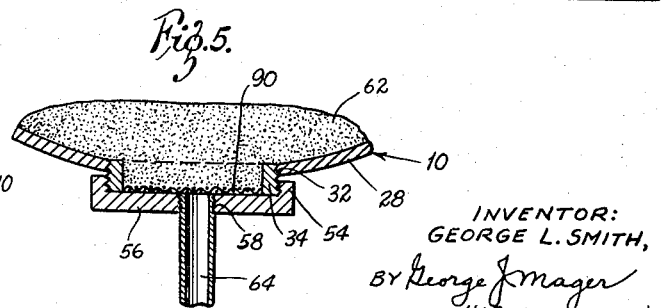
INVENTOR:
GEORGE L. SMITH,
BY George J Mager
HIS ATTORNEY

United States Patent Office 3,420,376
Patented Jan. 7, 1969

3,420,376
FILTER APPARATUS FOR SWIMMING
POOL WATER
George L. Smith, Frontenac, Mo.
(755 S. Lindbergh Blvd., St. Louis, Mo. 63131)
Filed Feb. 7, 1966, Ser. No. 525,576
U.S. Cl. 210—95      1 Claim
Int. Cl. E04h *3/20;* B01d *41/00*

ABSTRACT OF THE DISCLOSURE

An improved compact apparatus for filtering swimming pool water. Designed for installation adjacent to the pool, the apparatus includes: a cylindrical tank devoid inside the tank of any elements except the filtering media; means outside the tank for supporting the filtering media from below; a motor driven pump incorporated in a valve-controllable reverse-cycle piping arrangement; and appropriate means for supporting said tank in vertical position above ground level, and the therewith associated pump and piping arrangement in operative disposition relatively thereto. The piping arrangement preferably includes means adapted to visibly indicate when a backwash cycle may be terminated and followed by filtering cycle. Preferably, the filtering media is comprised of a mixture of anthracite and graded sand.

Background of the invention

For many years, the accepted filtering method has been to withdraw the swimming pool water via a pump that also serves to propel the water into and out of a tank containing sand, or a quantity of sand supported on and by a bed of gravel.

Public health regulations prescribe the number of times that the water in a swimming pool having a certain gallonage capacity must be filtered during specified periods of time. In order to comply with these regulations, it has been necessary to provide filter tanks that are large and unwieldy, inasmuch as the flow of water through the sand and gravel filtering media must be slow. That is to say, the average quantity of water that can be filtered by the method under consideration amounts to approximately four gallons per minute per each square foot of the sand and gravey filter media area. Were the rate of flow increased, sand particles would be forced downwardly through the interstices obtaining between the gravel bed constituents, and therefore would eventually travel onwardly toward and into the pool water. Obviously, such losses of sand particles will eventually reduce the efficiency of the tank. Furthermore, in consequence of such increased rate of flow, the pool water has a tendency to form a channel through the entire sand and gravel bed, and thus to be returned to the pool in unfiltered condition.

From the foregoing, it should be apparent that conventional filtering operations employing the sand and gravel method are slow, and require tanks of great dimensional proportions in order to filter the pool water in compliance with the health regulations.

More recently, in order to overcome some of the disadvantages mentioned, filter tanks of smaller dimensional proportions but greater flow rate capacity have been developed. These tanks however, are provided with piping, distributors, laterals, underdrains and the like, all disposed interiorly of said tanks. Consequently, these tanks must be provided with hand holes and covers therefor, so that access may be had to these interior elements for repair or replacement.

Summary of the invention

The primary objective of the present invention is to provide a novel apparatus adapted to overcome the shortcomings and disadvantages inherent in swimming pool water filtering methods and means presently in use.

Accordingly it is an object within the purview of the primary objective of this invention, to provide an apparatus that is compact, and includes a relatively small tank containing novel filtering media adapted to purify pool water more efficiently than is conventionally done, while at the same time providing for a more rapid flow of water through the tank than is possible with the use of conventional filter tanks.

It is another object of the invention to provide novel means outside the tank for supporting the filtering media inside the tank, and to eliminate the presence of any other elements except said media within the tank. In accordance with the concepts of this invention, the means for supporting the filtering media would be of such nature as to prevent passage therethrough of any fine particles of dirt or the like that may have been present in the pool water, as well as any fine particles of the filter media itself. Consequently the water, after passing through the filtering media inside the tank and then through the media supporting means located outside the tank, will return to the pool in a state of clarity not possible heretofore, even though the flow rate through the tank of the present invention is high, being approximately twenty gallons per minute per each square foot of filter media area.

Broadly, the invention provides a cylindrical tank having a convex top wall section, and a concave bottom wall section. Centrally thereof, the bottom wall section has formed therein a threaded circular opening adapted to be engaged by the threads of a nipple member and associated elements that comprise the means outside the tank for supporting a determined quantity of filtering media inside the tank. Appropriate means are provided for supporting the tank in vertical position above ground level, and for mounting a motor-driven pump adjacent to the tank. A valve-controlled piping arrangement associated with the pump, is provided for withdrawing water from the swimming pool, for delivering the pool water to the tank, and for returning the filtered water to the pool. In accordance with the concepts of this invention, the pool water is delivered to the tank in a horizontal plane above the level of the filtering media, rather than being delivered through the top of the tank in the conventional fashion. The pump operates continuously when the apparatus is in use.

As is well understood in this art, the dirt particles and like impurities extracted from the pool water and trapped in the filter media must be removed from the tank at intervals, in order to maintain operation efficiency. Such an operation is termed "backwashing" and would be effected by employment of the same piping arrangement aforesaid, it being only necessary to manipulate the included control valves, as will appear.

During a backwash cycle, water from the pool is pumped into the tank from the bottom, and forced upwardly through the supporting means therefor, and the thereabove filtering media. The upward flow of the pool water will loosen the entrapped dirt and like particles, and cause them to float upwardly in the body of water to the tank above the level of the filtering media, the dirt-laden water being discharged to waste. It is a feature of the present invention that the rate of flow through the tank during a backwash cycle will correspond to that during a filter cycle, namely approximately twenty gallons per minute per square foot of filter media area.

It is a further object of this invention to provide means for quickly determining when to terminate the backwash cycle and initiate the filtering cycle. Accordingly, a sight glass is incorporated in the piping through which the backwash water discharges. As soon as this water passing beneath the sight glass becomes clear, the viewer will know that the backwashing operation should be terminated. As will appear, dirt and like particles in the pool water cannot enter the tank from the bottom during backwashing operations.

Description of the drawings

The invention is illustrated on a sheet of drawings that accompanies this specification, and a more comprehensive understanding of its features and advantages may be had from the detailed description that follows with reference to said drawings, wherein:

FIGURE 1 is a top plan view of a filter apparatus embodying the present invention;

FIGURE 2 is a view, partially in elevation and partially in vertical section, taken on the line 2—2 of FIGURE 1;

FIGURE 3 is a side elevation of the apparatus as viewed from the left in FIGURE 2;

FIGURE 4 is a view on an enlarged scale, of a fragmentary portion of FIGURE 2;

FIGURE 5 is a view similar to FIGURE 4, illustrating a slight modification;

FIGURE 6 is a diagram indicating water flow during filtering operations; and

FIGURE 7 is a diagram indicating water flow during backwash operations.

Detailed description

With reference particularly to FIGURES 1, 2 and 3, the illustrated apparatus includes: a vertically disposed tank generally disignated 10; an appropriate supporting stand therefor that is indicated 12; a pump 14 driven by an associated motor 16; a piping system or arrangement generally designated 17; a two-way manually operable flow control valve 18; a first manually operable one-way control valve 20; and a second manually operable one-way control valve 22; said control valves being incorporated in the piping arrangement 17.

It is noted at this point that the motor-driven pump 14 is conventional. It is furthermore noted that the piping system or arrangement 17 and the valves incorporated therein are exemplary only, being shown for explanatory purposes hereinafter. Thus for example, a single multiport dial valve may be substituted for the three manually operable control valves if desired.

The tank 10 is comprised of a cylindrical shell 24 having a convex top wall section 26, and a concave bottom wall section 28. A valve-controlled air relief outlet arrangement, generally designated 30, is provided centrally of the top wall section 26, as shown only in FIGURES 1 and 2.

As best seen in FIGURE 4, the bottom wall section 28 of the tank has formed centrally therein a threaded circular opening 32. Numeral 34 designates an externally threaded nipple member, the upper portion thereof being in engagement with the opening 32, and the lower portion thereof projecting below the bottom wall section 28, as shown. Near the upper end thereof, the shell 24 is provided with a laterally projecting, internally threaded ferrule segment 36.

The tank supporting stand 12 shown in the drawings is exemplary only. It will be understood therefore, that the structure of said stand is not claimed herein as being a critical component of the present invention. However, the illustrated supporting stand will be described briefly. It includes a cylindrical section 40 that terminates at the top in a circular concave seat portion 42 adapted to encompass a portion of the tank wall section 28, and at the bottom in an outstanding circular flange 44 adapted to rest on, or be secured to a horizontal surface adjacent to a swimming pool. For a reason to appear, the cylindrical section 40 has formed therein a rectangular opening designated 46, best seen in FIGURE 3.

The pump-motor assembly 14–16 is shown mounted on an angular bracket 48 having an arcuate depending flange segment 50 that is welded as suggested at 52 in FIGURE 3, to the cylindrical section 40 of the stand 12.

Obviously, the pump-motor assembly 14–16 may be supported in other appropriate fashion if desired. The valve 18 is a conventional two-way valve, and it is not deemed necessary to illustrate its internal structure. The valves 20 and 22 are likewise conventional, preferably but not necessarily being of the gate valve type.

With attention again directed especially to FIGURE 4, the externally threaded lower end portion of the nipple member 34 has applied thereto an internally threaded cup-shaped element designated 54. The element 54 includes a bottom wall portion 56 having a central threaded opening 58 formed therein.

Numeral 60 designates a disc of resin-bonded silica sand, having a peripheral diameter corresponding to the internal diameter of the nipple member 34. The disc 60 has a tight fit within said nipple, and in combination with the cup-shaped element 54, forms the outside supporting means for the body of filtering media 62 disposed thereabove inside the tank 10.

It should be observed at this point that the disc 60 although porous, is not pervious, so that particles of the thereabove filtration media 62 cannot pass therethrough, whereas water will do so. Preferably, the media 62 is comprised of a mixture of anthracite and grated sand that may be introduced into the tank from the bottom prior to insertion of the disc 60, application of the member 54, and the positioning of said tank atop the supporting stand 12. Alternatively, the media may be introduced into the tank via the ferrule 36, or via a sealable opening provided in the top wall section 26, as should be understood.

For best results, a sufficient quantity of the media 62 is entered to provide a level L approximately midway between the top and bottom of the tank 10, as shown in FIGURE 2. The tank 10 exemplarily illustrated, has a diameter of twenty inches and a height of approximately 36 inches, but the size may vary, so that the dimensions of a tank of course determine the quantity of media therein. Instead of the mixture mentioned, the media 62 may consist of fine sand only.

The typical piping system or arrangement 17 includes a vertical pipe 64 having a threaded upper end portion in engagement with the opening 58. This pipe is connected via an elbow 66 to a horizontally disposed pipe 68 that extends through the opening 46 of a T fitting 70. A pipe 72 extends between the T 70 and the two-way valve 18, and a pipe 73, equipped with the manual control valve 22 leads from said T to a swimming pool (not shown). The T 70 is provided with a drain plug 74.

Leading from the pool to the intake or suction side of the pump 14 is a pipe 76, and a pipe 78 leads from the discharge side of said pump to the two-way valve 18. A pipe 80 leads from the two-way valve 18 to a T fitting 82 that is equipped with a sight glass 84. A pipe 86 having its threaded discharge end in engagement with the ferrule 36, extends betwen the T fitting 82 and the interior of the tank 10. The control valve 20 is interposed in a pipe 88 leading from the T 82 to waste.

With attention directed to FIGURE 5, it will be observed that the structure there illustrated is identical with that shown in FIGURE 4, except that a disc of extremely fine mesh screening 90 is substituted for the disc 64, and functions in identical fashion. The disc 90 may be circumferentially soldered or welded to the nipple 34, if desired. And of course with respect also to FIGURE 4, the upper end portion of the nipple element 34 may be welded into the opening 32, or said nipple element may comprise an integral depending extension of the tank bottom wall section 28.

Operation

Although it is believed that the functioning of the apparatus should be apparent from the drawings, a brief explanation will be given. The motor-driven pump 14 is in continuous operation during both filtration and backwashing cycles. The valve of the air relief arrangement 30 is closed during both said operations.

Assuming that filtering is in progress, the apparatus would be in the condition diagrammatically suggested in FIGURE 6. That is to say, the control valve 20 would be closed, the control valve 22 would be open, and the two-way valve 18 would be in such position as to establish direct fluid communication between the pipes 78 and 80, while at the same time shutting off any flow to the pipe 72. Consequently, swimming pool water drawn into the suction side of the pump 14 via the line 76 is propelled through the pipe 78, valve 18, pipe 80, T fitting 82 and pipe 86 into the tank. The horizontal disposition of the pipe 86 causes the water entering the tank to impart a swirling action to the water already in the tank above the media level L.

As the pool water under pressure passes through the media 62, all dirt particles and similar impurities in the water are trapped in said media, and the thus filtered water passes through the resin-bonded silica sand disc 60 and into the pipe 64. From pipe 64, the now extremely clear water returns to the swimming pool via the piping elements 66, 68, 70, and 73. The filtering process would be continuous as hereinbefore noted.

Assuming that a filtering operation has been in progress for a prescribed length of time, and it is now requisite to initiate a backwash operation, only three simple steps need be taken. Thus, as suggested in FIGURE 7, the valve 20 would be opened, the valve 22 would be closed, and the two-way valve 18 would be manipulated so as to establish fluid communication between the pipes 78 and 72, while at the same time shutting off flow to the pipe 80.

Consequently, swimming pool water drawn into the suction side of the pump 14 via the line 76 will be propelled via the pipe 78, valve 18, pipe 72, T fitting 70, and piping elements 68, 66 and 64 to proceed upwardly through the disc 60 and the filter media 62. As a result, the dirt particles and other impurities accummulated atop, and trapped within said media during the preceding filtering operation, would be dislodged to flow upwardly in the tank, dirt-laden water being discharged to waste via the pipe 86, T element 82, and pipe 88.

The condition of the water being discharged to waste may be observed via the sight glass 92. Thus, the duration of the backwashing operation would depend on the increasing clarity of the water flowing through the piping aforesaid, and thus beneath the sight glass 84. Normally, a backwashing cycle of four to five minutes duration will suffice to flush the accummulated dirt particles from the tank 10 of the present invention.

Assuming now that in consequence of sight glass observation the water being discharged from the tank has become clear, the apparatus would be restored to filtration status by simply manipulating the two-way valve 18 and the control valves 20 and 22 to the positions thereof indicated in FIGURE 6.

Obviously, during the winter months or for that matter at any time, it may be desirable to drain the tank for storage or other reasons, as is understood. Wherefore the removable drain plug 74 is provided in a lowermost plane relatively to the other components of the apparatus comprising the present invention. To facilitate draining, the air relief outlet would be opened.

In view of the foregoing description and the accompanying drawings, it is believed that a comprehensive presentation of the invention has been given. It will be remembered however, that the illustrated piping, valving and the like is subject to modification without departing from the main concept of the present invention, that being the provision of a filter tank devoid of any elements except the filtering media inside the tank, and means for supporting said media from outside the tank.

What I claim is:

1. In an apparatus for filtering swimming pool water, the combination including:
   a motor-driven water pump incorporated in a valve-controllable reverse-cycle piping arrangement of the character described;
   a filter tank comprising a cylindrical shell having a convex top wall section and a concave bottom wall section;
   an internally threaded ferrule projecting laterally therefrom near the upper end of the shell in engagement with the threaded end portion of a horizontally disposed pipe included in said piping arrangement, said pipe having a sight-glass incorporated therein;
   a valve-controlled air relief outlet provided centrally in the shell top wall section;
   a threaded circular opening formed centrally in the shell bottom wall section;
   a determined quantity of filter media inside the tank, said media being comprised of though not limited to a mixture of anthracite and graded sand having its upper level approximately midway between the top and bottom walls of the tank, said media constituting the sole element inside the tank;
   means supporting the filter media from outside the tank, said means including a porous disc comprised of resin-bonded silica sand and an internally threaded cup-shaped member in engagement with a projecting lower end of a nipple element, which in turn is in engagement with the opening in the bottom wall section, said cup-shaped member including a bottom wall portion having a threaded central opening therein in engagement with the threaded upper end portion of a vertically disposed pipe included in said piping arrangement, the porous disc being seated in said nipple element contiguously to the bottom wall of the cup-shaped member; and
   means for supporting the tank in vertical position, and the piping arrangement in operative position relatively to said tank.

References Cited

UNITED STATES PATENTS

| | | | |
|---|---|---|---|
| 1,557,117 | 10/1925 | Sweeney | 210—277 |
| 2,845,179 | 7/1958 | Riole et al. | 210—315 |
| 3,011,643 | 12/1961 | McCoy | 210—169 |
| 3,276,588 | 10/1966 | Nehrbass et al. | 210—169 |

REUBEN FRIEDMAN, *Primary Examiner.*

THEODORE A. GRANGER, *Assistant Examiner.*

U.S. Cl. X.R.

210—169, 275, 483